US008607282B2

(12) United States Patent
Lee et al.

(10) Patent No.: US 8,607,282 B2
(45) Date of Patent: Dec. 10, 2013

(54) VIDEO ON DEMAND SERVICE METHOD, VIDEO ON DEMAND RECEIVER, AND VIDEO ON DEMAND SERVER

(75) Inventors: Woo-hyoung Lee, Yongin-si (KR); Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 12/115,813

(22) Filed: May 6, 2008

(65) Prior Publication Data

US 2009/0044234 A1 Feb. 12, 2009

(30) Foreign Application Priority Data

Aug. 6, 2007 (KR) ........................ 10-2007-0078698

(51) Int. Cl.
*H04N 7/173* (2011.01)
(52) U.S. Cl.
USPC ................... 725/87; 725/86; 725/88; 725/89; 725/90
(58) Field of Classification Search
USPC ..................................................... 725/86–90
See application file for complete search history.

(56) References Cited

U.S. PATENT DOCUMENTS

| 5,530,754 | A  | * | 6/1996  | Garfinkle ........................... 725/8 |
| 6,018,359 | A  | * | 1/2000  | Kermode et al. .............. 725/101 |
| 6,701,528 | B1 | * | 3/2004  | Arsenault et al. ................ 725/89 |
| 6,988,278 | B2 |   | 1/2006  | Gomez |
| 7,607,157 | B1 | * | 10/2009 | Inoue et al. .................... 725/102 |
| 7,801,303 | B2 | * | 9/2010  | Dulac ............................ 380/200 |
| 2002/0129375 | A1 |   | 9/2002  | Kim et al. |
| 2003/0229899 | A1 |   | 12/2003 | Thompson et al. |
| 2004/0111756 | A1 | * | 6/2004  | Stuckman et al. ............ 725/142 |
| 2004/0210947 | A1 |   | 10/2004 | Shusman |
| 2004/0268410 | A1 |   | 12/2004 | Barton et al. |
| 2005/0071491 | A1 |   | 3/2005  | Seo |
| 2011/0197216 | A1 | * | 8/2011  | Sie et al. ......................... 725/25 |

FOREIGN PATENT DOCUMENTS

| JP | 2005184472 A | 7/2005 |
| KR | 2003-0065719 A | 8/2003 |
| KR | 1020040026388 A | 3/2004 |

OTHER PUBLICATIONS

Communication dated Jul. 6, 2010 from the European Patent Office in counterpart application No. 08766074.2.
Communication dated Oct. 15, 2012 from the Korean Intellectual Property Office in counterpart Korean application No. 10-2007-0078698.
Communication dated Sep. 11, 2012 from the State Intellectual Property Office of P.R. China in counterpart Chinese application No. 200880102490.9.
Communication issued on Mar. 26, 2012 by the State Intellectual Property Office of the P.R. of China in the counterpart Chinese Patent Application No. 200880102490.9.
Communication issued on Mar. 27, 2012 by the Korean Patent Office in the counterpart Korean Patent Application No. 10-2007-0078698.

(Continued)

*Primary Examiner* — Nicholas Corbo
(74) *Attorney, Agent, or Firm* — Sughrue Mion, PLLC

(57) ABSTRACT

Provided are a video on demand (VOD) service method, a VOD receiver, and a VOD server. The VOD service method includes downloading a first content from a VOD server in a download-and-play mode, receiving feedback information from a client terminal during buffering the first content in order to reproduce the first content, and transmitting the feedback information to the VOD server.

18 Claims, 5 Drawing Sheets

(56) References Cited

OTHER PUBLICATIONS

Communication dated May 24, 2012 from the Mexican Institute of Industrial Property in counterpart Mexican application No. MX/a/2010/001473.

Communication dated Nov. 30, 2011, issued by the Mexican Patent Office in corresponding Mexican Patent Application No. MX/a/2010/001473.

Communication dated Oct. 26, 2011, issued by the State Intellectual Property Office of P.R. China in corresponding Chinese Patent Application No. 200880102490.9.

* cited by examiner

VIDEO ON DEMAND SERVICE METHOD, VIDEO ON DEMAND RECEIVER, AND VIDEO ON DEMAND SERVER

CROSS-REFERENCE TO RELATED PATENT APPLICATION

This application claims priority from Korean Patent Application No. 10-2007-0078698, filed on Aug. 6, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to video on demand (VOD), and more particularly, to a VOD service method, a VOD receiver, and a VOD server for providing a fast VOD service to clients.

2. Description of the Related Art

Recently, interest in a VOD service by digital broadcasting was increased. Examples of VOD service by digital broadcasting are disclosed in U.S. Pat. Nos. 4,506,387; 4,890,320; 4,995,078; 5,063,610; 5,206,722; and 5,253,275.

FIG. 1 is a block diagram of a related art VOD service system.

Referring to FIG. 1, the related art VOD service system includes a client terminal 110, a VOD receiver 120, and a VOD server 130.

The client terminal 110 is connected to the VOD receiver 120. The client terminal 110 requests the VOD receiver 120 to transmit a VOD content and reproduces a received VOD content. The VOD receiver 120 is connected to the VOD server 130 by a network. The VOD receiver 120 processes the VOD content received through the network.

The VOD server 130 maintains and manages a plurality of VOD contents. The VOD server 130 transmits a VOD content requested by the VOD receiver 120 to the VOD receiver 120.

In general, the VOD receiver 120 buffers a VOD content received from the VOD server 130 and transmits the VOD content to the client terminal 110. In a VOD service using the above-described VOD receiver 120, VOD data transmitted to the VOD receiver 120 is generally processed by real-time streaming. However, due to limitations in frequency bandwidths, the VOD service cannot ensure satisfactory service quality to clients by only real-time streaming.

SUMMARY OF THE INVENTION

The present invention provides a VOD service method, a VOD receiver, and a VOD server for overcoming limitations in frequency bandwidths and providing a fast VOD service to clients.

According to an aspect of the present invention, there is provided a VOD service method including downloading a first content from a VOD server in a download-and-play mode; buffering in order to reproduce the first content; receiving feedback information from a client terminal during the buffering; and transmitting the feedback information to the VOD server.

The VOD service method may further include downloading a second content extracted from the VOD server based on the feedback information, in a push VOD mode.

The second content may be downloaded through one of the Internet, an over-the-air channel, and a cable channel.

The VOD service method may further include reproducing the second content before the first content is downloaded from the VOD server in the download-and-play mode, if a content selected by the client server is identical to the second content and is stored.

The VOD service method may further include downloading an initial part of the second content extracted from the VOD server based on the feedback information, in a push VOD mode, wherein the initial part of the second content is to be reproduced during the buffering in the download-and-play mode.

The VOD service method may further include, if the second content is selected to be reproduced by the client terminal, downloading the entire part or the remaining part of the second content from the VOD server in the download-and-play mode; reproducing the initial part of the second content during buffering in order to reproduce the remaining part of the second content; and reproducing the remaining part of the second content.

According to another aspect of the present invention, there is provided a VOD service method including uploading a first content to a VOD receiver in a download-and-play mode; and receiving feedback information from the VOD receiver during buffering in order to reproduce the first content.

The VOD service method may further include extracting a second content preferred by a client based on the feedback information.

The VOD service method may further include uploading the entire part or an initial part of the second content in a push VOD mode, wherein the initial part of the second content is to be reproduced during the buffering in the download-and-play mode.

The entire part or the initial part of the second content may be uploaded through Internet, an over-the-air channel, and a cable channel.

According to another aspect of the present invention, there is provided a VOD service method including storing an initial part of a content which is to be reproduced during buffering in a download-and-play mode; downloading the entire part or the remaining part of the content from a VOD server in the download-and-play mode; reproducing the initial part of the content during the buffering in order to reproduce the remaining part of the content; and reproducing the remaining part of the content.

According to another aspect of the present invention, there is provided a VOD receiver including a download unit for downloading a first content from a VOD server in a download-and-play mode; a buffer unit for buffering in order to reproduce the first content; a feedback information reception unit for receiving feedback information from a client terminal during the buffering; and a feedback information transmission unit for transmitting the feedback information to the VOD server.

According to another aspect of the present invention, there is provided a VOD server including an upload unit for uploading a first content to a VOD receiver in a download-and-play mode; and a feedback information reception unit for receiving feedback information from the VOD receiver during buffering in order to reproduce the first content.

According to another aspect of the present invention, there is provided a computer readable recording medium having recorded thereon a computer program for executing a VOD service method including downloading a first content from a VOD server in a download-and-play mode; buffering in order to reproduce the first content; receiving feedback information from a client terminal during the buffering; and transmitting the feedback information to the VOD server.

According to another aspect of the present invention, there is provided a computer readable recording medium having recorded thereon a computer program for executing a VOD service method including uploading a first content to a VOD receiver in a download-and-play mode; and receiving feedback information from the VOD receiver during buffering in order to reproduce the first content.

According to another aspect of the present invention, there is provided a computer readable recording medium having recorded thereon a computer program for executing a VOD service method including storing an initial part of a content which is to be reproduced during buffering in a download-and-play mode; downloading the entire part or the remaining part of the content from a VOD server in the download-and-play mode; reproducing the initial part of the content during the buffering in order to reproduce the remaining part of the content; and reproducing the remaining part of the content.

BRIEF DESCRIPTION OF THE DRAWINGS

The above and other aspects of the present invention will become more apparent from the following detailed description of exemplary embodiments thereof with reference to the attached drawings in which.

DETAILED DESCRIPTION OF EXEMPLARY EMBODIMENTS OF THE INVENTION

Hereinafter, the present invention will be described in detail by explaining embodiments of the invention with reference to the attached drawings.

Figure 1:
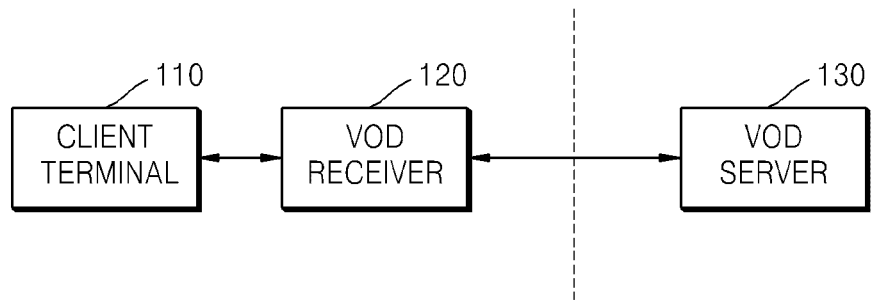
FIG. 1 is a block diagram of a related art VOD service system.
Figure 2:
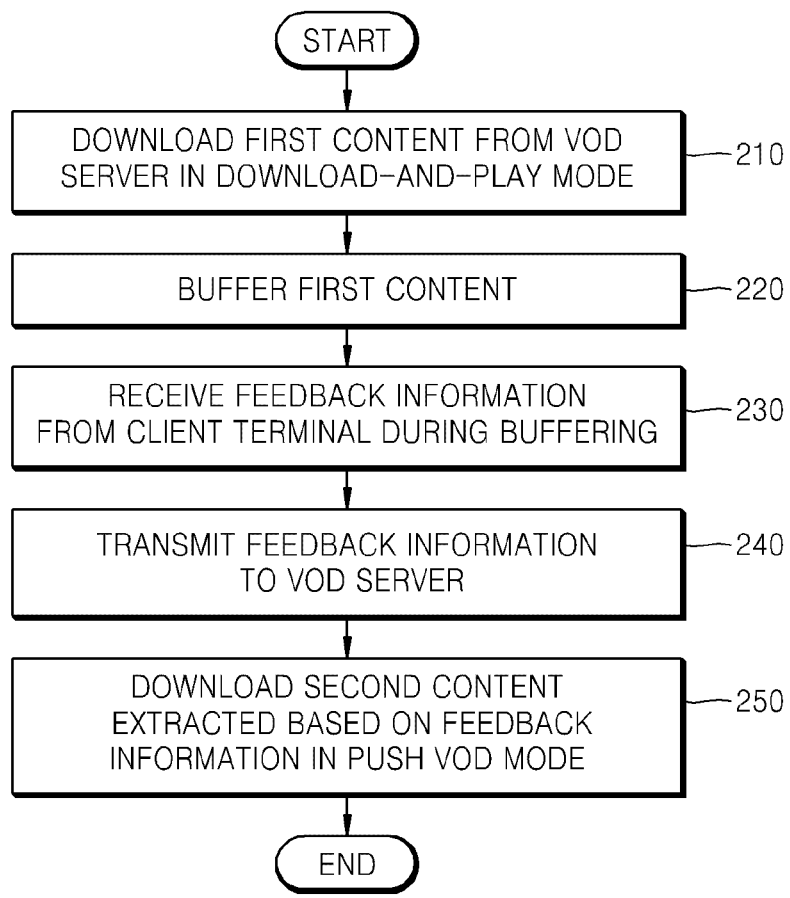
FIG. 2 is a flowchart of a VOD service method according to an exemplary embodiment of the present invention.

FIG. 2 is a flowchart of a VOD service method according to an exemplary embodiment of the present invention.

Referring to FIG. 2, in operation 210, a VOD receiver downloads a first content from a VOD server in a download-and-play mode. If a client selects the first content, the VOD receiver starts to download the selected first content from the VOD server. The first content starts to be reproduced after buffering the first content (the download-and-play mode). The VOD server and the VOD receiver include storage devices for performing a buffering function. For example, if the client selects the first content to be viewed, the VOD receiver downloads the selected first content from the VOD server at a speed of 10 to 15 megabits per second (Mbps) and the first content may be reproduced after an initial download time of approximately one minute has passed.

Also, during buffering of the first content, the VOD receiver may display only a client interface image for obtaining feedback information to be described later, on a screen of a client terminal. Alternatively, the VOD receiver may display advertisements or trailers of broadcasting contents together with the client interface image on the screen of the client terminal.

In operation 220, the VOD receiver buffers in order to reproduce the first content.

In operation 230, the VOD receiver receives the feedback information from the client terminal during the buffering. The feedback information is all information transmitted from the client terminal to the VOD server by the client. For example, the feedback information may be information regarding the preference of the client for a broadcasting content being reproduced on the client terminal or information regarding preferred programs of general clients. In the present invention, the range of the feedback information is not limited.

In operation 240, the VOD receiver transmits the feedback information to the VOD server. For example, the transmitted feedback information may be used for constructing a client profile database or extracting a group of contents preferred by the client.

In operation 250, the VOD receiver downloads a second content extracted from the VOD server based on the feedback information, in a push VOD mode. In the exemplary embodiments of the present invention, the push VOD mode means that the second content selected from the VOD server is pushed (transmitted) to the VOD receiver in one direction regardless of selection of the client. The second content may not necessarily be downloaded through a network such as the Internet and may also be downloaded through various channels such as an over-the-air channel or a cable channel.

In the push VOD mode, generally, the second content is pushed to the VOD receiver while the network is paused. For example, the second content of two hours duration may be downloaded to the VOD receiver for eight hours during the night time. The push VOD mode enables efficient use of frequency bands and does not require buffering that is necessarily performed in the download-and-play mode. According to an exemplary embodiment of the present invention, operation 250 may be omitted.

The second content downloaded in the push VOD mode may be reproduced if a content selected by the client server is downloaded in the push VOD mode (that is, is identical to the second content) and is not deleted from the VOD receiver before the first content is downloaded from the VOD server in the download-and-play mode. Since second content downloaded in the push VOD mode may be periodically updated, it is required to check whether the second content is deleted from the VOD receiver.

Figure 3:
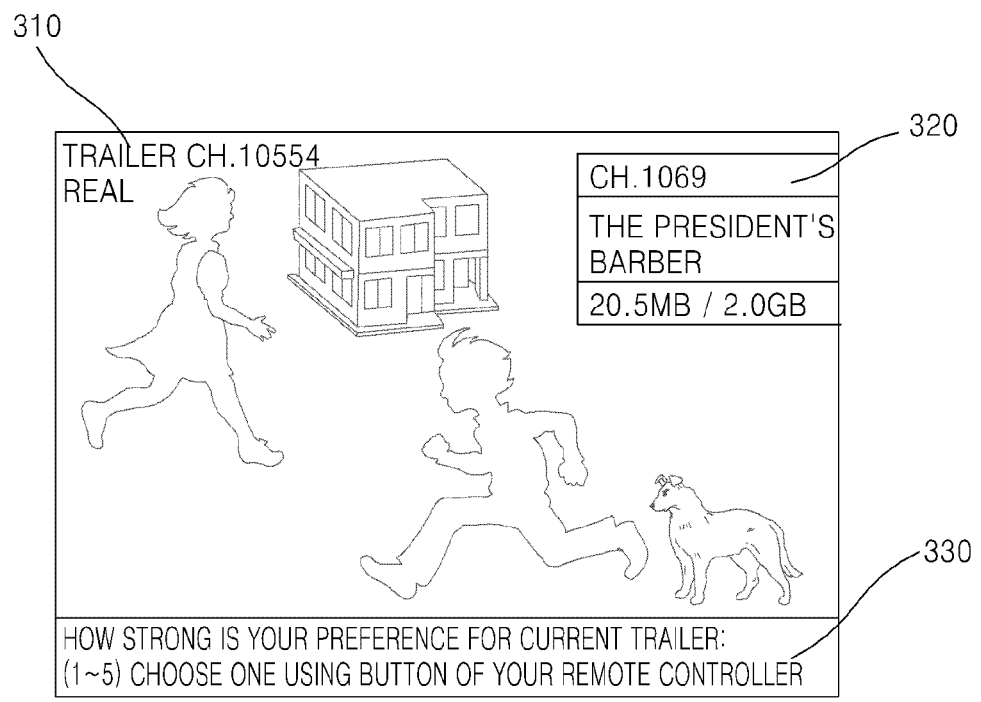
FIG. 3 is an illustration of an image displayed on a screen of a client terminal, according to the exemplary embodiment of FIG. 2.

FIG. 3 is an illustration of an image displayed on a screen of a client terminal, according to the exemplary embodiment of FIG. 2.

On the screen of the client terminal, a trailer of a broadcasting content 310 and a client interface image 330 are displayed. Also, a download status indication 320 of a content selected by a client is displayed. The client may transmit feedback information to a VOD sever with reference to the client interface image 330.

Figure 4:
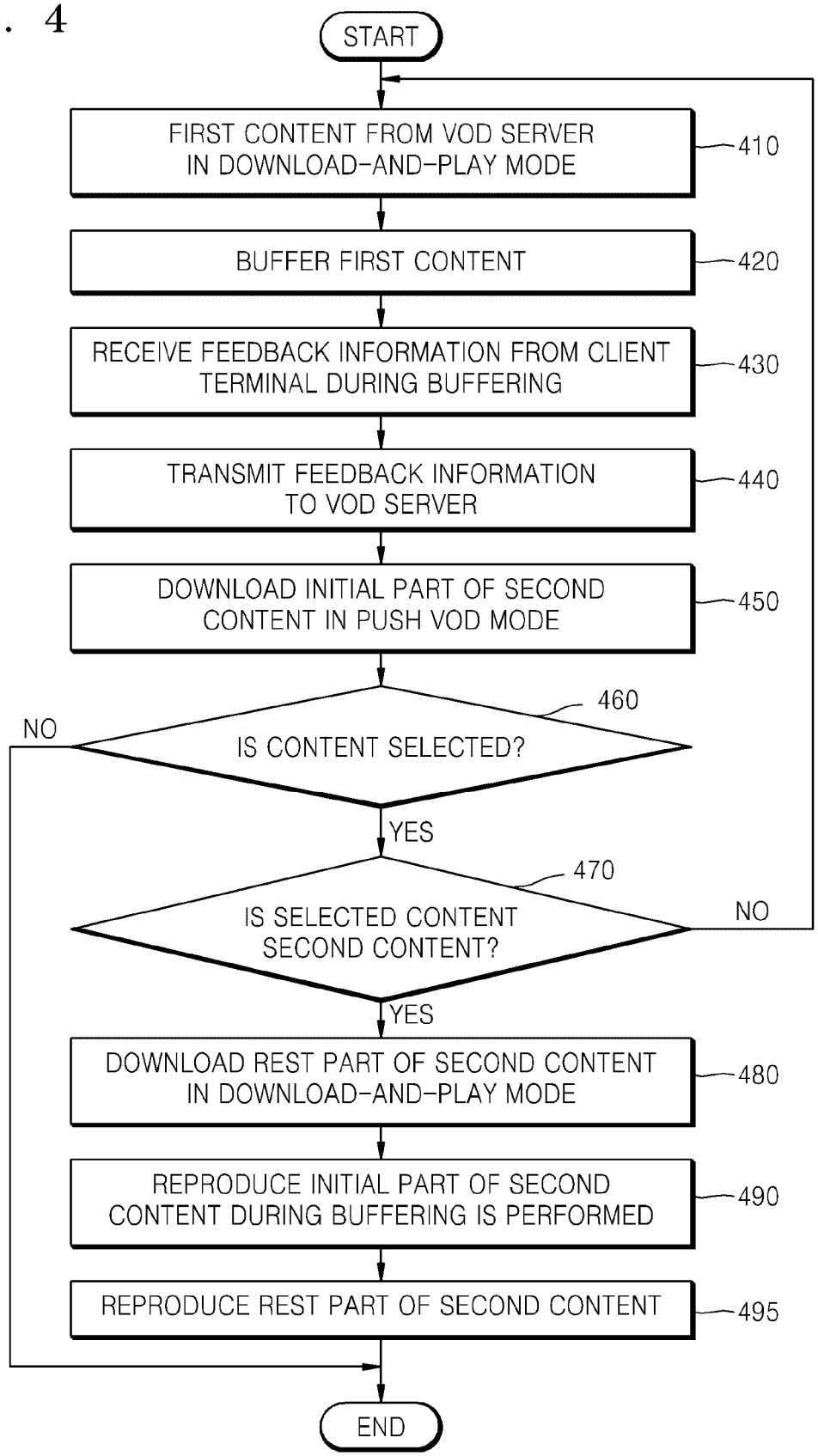
FIG. 4 is a flowchart of a VOD service method according to another exemplary embodiment of the present invention.

FIG. 4 is a flowchart of a VOD service method according to an exemplary embodiment of the present invention.

Referring to FIG. 4, in operation 410, a VOD receiver downloads a first content from a VOD server in a download-and-play mode.

In operation 420, the VOD receiver performs buffering in order to reproduce the first content.

In operation 430, the VOD receiver receives feedback information from a client terminal during the buffering.

In operation 440, the VOD receiver transmits the feedback information to the VOD server.

In operation 450, the VOD receiver downloads an initial part of a second content extracted by the VOD server, based on the feedback information. In the exemplary embodiment of the present invention, the initial part of the second content is a part of the second content which is to be reproduced during the buffering in the download-and-play mode. For example, if the buffering in the download-and-play mode is about 30 to 60 seconds and data corresponding to the buffering time is 20 megabytes (MB), the VOD server may push 20 MB of the initial part of the second content to the VOD receiver. Accordingly, if the client selects the second content, the second content may be reproduced without buffering. After the initial part of the second content is completely reproduced, the remaining part of the second content which is downloaded in the download-and-play mode is sequentially reproduced. The initial part of the second content may not necessarily be downloaded through a network such as the Internet and may also be downloaded by using an over-the-air service or a cable service.

In operation 460, the VOD receiver determines whether a content is selected by the client terminal. If any content is not selected, a VOD service is ended.

In operation 470, if the content is selected by the client terminal, the VOD receiver determines whether the selected content is the second content stored in the VOD receiver.

In operation 480, if the selected content is the second content stored in the VOD receiver, the VOD receiver downloads the entire part or the remaining part of the second content from the VOD server in the download-and-play mode. In the exemplary embodiment of the present invention, the entire part of the second content is all data of the second content to be reproduced and the remaining part of the second content is the entire part subtracted by the initial part of the second content which is to be reproduced during the buffering.

In operation 490, the VOD receiver reproduces the initial part of the second content during buffering in order to reproduce the remaining part of the second content.

In operation 495, the VOD receiver reproduces the remaining part of the second content after the remaining part of the second content is completely buffered.

Figure 5:
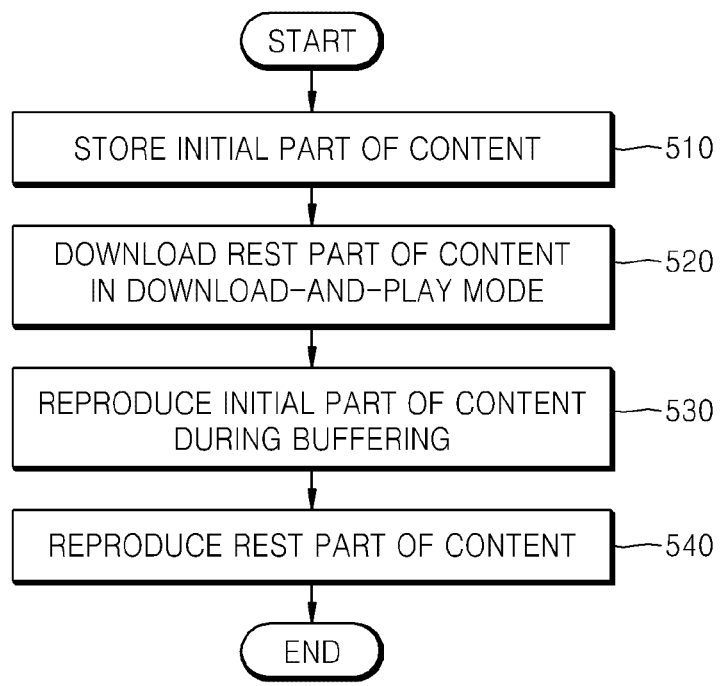
FIG. 5 is a flowchart of a VOD service method according to another exemplary embodiment of the present invention.

FIG. 5 is a flowchart of a VOD service method according to an exemplary embodiment of the present invention.

Referring to FIG. 5, in operation 510, a VOD receiver stores an initial part of a content which is to be reproduced during buffering in a download-and-play mode. According to the exemplary embodiment, the initial part of the content is not extracted from feedback information of a client and may be randomly selected by a VOD provider. Alternatively, the initial part of the content may be selected based on client profile information obtained by using various methods.

In operation 520, the VOD receiver downloads the entire part or the remaining part of the content from a VOD server in the download-and-play mode.

In operation 530, the VOD receiver reproduces the initial part of the content during buffering in order to reproduce the remaining part of the content.

In operation 540, the VOD receiver sequentially reproduces the remaining part of the content after the initial part of the content is completely reproduced.

Figure 6:
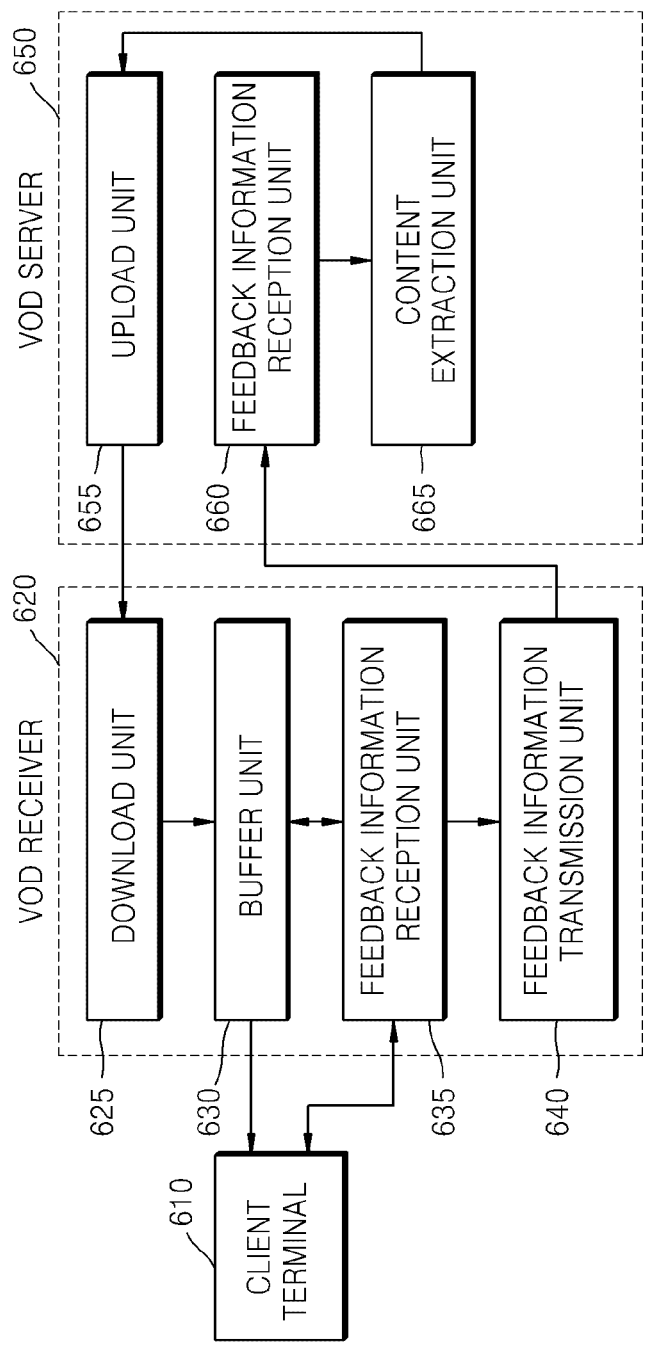
FIG. 6 is a block diagram of a VOD service system according to an exemplary embodiment of the present invention.

FIG. 6 is a block diagram of a VOD service system according to an exemplary embodiment of the present invention.

Referring to FIG. 6, the VOD service system includes a client terminal 610, a VOD receiver 620, and a VOD server 650.

The client terminal 610 is connected to the VOD receiver 620. The client terminal 610 requests the VOD receiver 620 to transmit a VOD content and reproduces a received VOD content.

The VOD receiver 620 is connected to the VOD server 650 through various channels. Here, the channels may include Internet, an over-the-air channel, or a cable channel.

The VOD receiver 620 includes a download unit 625, a buffer unit 630, a feedback information reception unit 635, and a feedback information transmission unit 640.

The download unit 625 downloads a first content from the VOD server 650 in a download-and-play mode. The download unit 625 may download a second content extracted from the VOD server based on the feedback information, in a push VOD mode.

The buffer unit 630 performs buffering in order to reproduce the first content.

The feedback information reception unit 635 receives the feedback information from the client terminal 610 during the buffering.

The feedback information transmission unit 640 transmits the feedback information received from the client terminal 610 to the VOD server 650.

The VOD server 650 maintains and manages a plurality of VOD contents. The VOD server 650 transmits a VOD content requested by the VOD receiver 620 to the VOD receiver 620 through various channels.

The VOD server 650 includes an upload unit 655, a feedback information reception unit 660, and a content extraction unit 665.

The upload unit 655 uploads the first content to the VOD receiver 620 in the download-and-play mode. Also, the upload unit 655 may upload the second content to the VOD receiver 620 in the push VOD mode.

The feedback information reception unit 660 receives the feedback information from the VOD receiver 620 during the buffering in order to reproduce the first content.

The content extraction unit 665 extracts a second content preferred by a client based on the feedback information received from the VOD receiver 620.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to an exemplary embodiment of the present invention, by receiving feedback information from a client terminal during buffering in a download-and-play mode, client profile information may be obtained and fast VOD service may be provided to clients.

Furthermore, by reproducing an initial part of a content, which is previously stored, during buffering in a download-and-play mode, clients may view a selected content without waiting.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A video on demand (VOD) service method comprising:
downloading a first content from a VOD server in a download-and-play mode;
buffering the first content in order to reproduce the first content;
receiving feedback information from a client terminal during the buffering of the first content and during the downloading of the first content;
transmitting the feedback information to the VOD server during the buffering of the first content and during the downloading of the first content;
downloading an initial part of a second content extracted from the VOD server based on the feedback information, in a push VOD mode, wherein the initial part of the second content is reproduced during a buffering of a remaining part of the second content in the download-and-play mode, wherein the initial part of the second content and the remaining part of the second content are parts of a same content;
downloading the remaining part of the second content from the VOD server in the download-and-play mode if the second content is selected to be reproduced by the client terminal, wherein during the downloading of the remaining part of the second content only the remaining part of an entire part of the second content is downloaded;
reproducing the initial part of the second content during a buffering of the remaining part of the second content in order to reproduce the remaining part of the second content; and
reproducing the remaining part of the second content.

2. The VOD service method of claim 1, wherein the second content is downloaded through one of the Internet, an over-the-air channel, and a cable channel.

3. The VOD service method of claim 1, further comprising reproducing the second content before downloading the first content from the VOD server in the download-and-play mode, if a content selected by the client terminal is identical to the second content and is stored.

4. The VOD service method of claim 1, wherein the initial part of the second content is downloaded through one of the Internet, an over-the-air channel, and a cable channel.

5. A video on demand (VOD) service method comprising:
uploading a first content to a VOD receiver in a download-and-play mode; and
receiving feedback information from the VOD receiver during buffering of the first content and during the uploading of the first content, wherein the buffering of the first content is performed in order to reproduce the first content;
extracting a second content preferred by a client based on the feedback information;
uploading an initial part of the second content in a push VOD mode, wherein the initial part of the second content is reproduced during a buffering of a remaining part of the second content in the download-and-play mode, wherein the initial part of the second content and the remaining part of the second content are parts of a same content;
uploading the remaining part of the second content from the VOD server in the download-and-play mode, wherein during the uploading of the remaining part of the second content only the remaining part of an entire part of the second content is uploaded;
reproducing the initial part of the second content during a buffering of the remaining part of the second content in order to reproduce the remaining part of the second content; and
reproducing the remaining part of the second content.

6. The VOD service method of claim 5, wherein the initial part of the second content is uploaded through one of the Internet, an over-the-air channel, and a cable channel.

7. A video on demand (VOD) receiver comprising:
a download unit which downloads a first content from a VOD server in a download-and-play mode;
a buffer unit which buffers the first content in order to reproduce the first content;
a feedback information reception unit which receives feedback information from a client terminal during the buffering of the first content by the buffer unit and during the downloading of the first content by the download unit; and
a feedback information transmission unit which transmits the feedback information to the VOD server during the buffering of the first content by the buffer unit and during the downloading of the first content by the download unit,
wherein the download unit downloads an initial part of a second content extracted from the VOD server based on the feedback information, in a push VOD mode, wherein the initial part of the second content is reproduced during a buffering of a remaining part of the second content in the download-and-play mode, wherein the initial part of the second content and the remaining part of the second content are parts of a same content,
the download unit downloads the remaining part of the second content from the VOD server in the download-and-play mode, wherein during a downloading of the remaining part of the second content only the remaining part of an entire part of the second content is downloaded, and
the buffering unit buffers the remaining part of the second content during the reproduction of the initial part of the second content in order to reproduce the remaining part of the second content.

8. The VOD receiver of claim 7, wherein the second content is downloaded through one of the Internet, an over-the-air channel, and a cable channel.

9. A video on demand (VOD) server comprising:
an upload unit which uploads a first content to a VOD receiver in a download-and-play mode;
a feedback information reception unit which receives feedback information from the VOD receiver during buffering of the first content and during the uploading of the first content by the upload unit, wherein the buffering of the first content is performed in order to reproduce the first content; and
a content extraction unit which extracts a second content preferred by a client based on the feedback information,
wherein the upload unit uploads an initial part of the second content in a push VOD mode, wherein the initial part of the second content is reproduced during a buffering of a remaining part of the second content in the download-and-play mode, wherein the initial part of the second content and the remaining part of the second content are parts of a same content, and
the upload unit uploads the remaining part of the second content from the VOD server in the download-and-play mode, wherein during an uploading of the remaining part of the second content only the remaining part of an entire part of the second content is uploaded.

10. The VOD server of claim 9, wherein the second content is uploaded through one of the Internet, an over-the-air channel, and a cable channel.

11. A video on demand (VOD) service method comprising:
receiving feedback information from a client terminal during a buffering of a first content and during a downloading of the first content;
transmitting the feedback information to a VOD server during the buffering of the first content and during the downloading of the first content;
selecting a second content at the VOD server based on the feedback information;
storing at a VOD receiver an initial part of the second content which is to be reproduced during buffering of a remaining part of the second content in a download-and-play mode, wherein the initial part of the second content and the remaining part of the second content are parts of a same content;
downloading at the VOD receiver the remaining part of the second content from the VOD server in the download-and-play mode such that only the remaining part of an entire part of the second content is downloaded during the downloading of the remaining part of the second content;
reproducing the initial part of the second content during the buffering of the remaining part of the second content in order to reproduce the remaining part of the second content; and
reproducing the remaining part of the second content.

12. A non-transitory computer readable recording medium having recorded thereon a computer program for executing a video on demand (VOD) service method comprising:
downloading a content from a VOD server in a download-and-play mode;
buffering the content in order to reproduce the content;
receiving feedback information from a client terminal during the buffering of the content and during the downloading of the content;
transmitting the feedback information to the VOD server during the buffering of the content and during the downloading of the content;
downloading an initial part of a second content extracted from the VOD server based on the feedback information, in a push VOD mode, wherein the initial part of the second content is reproduced during a buffering of a remaining part of the second content in the download-and-play mode, wherein the initial part of the second content and the remaining part of the second content are parts of a same content;
downloading the remaining part of the second content from the VOD server in the download-and-play mode if the second content is selected to be reproduced by the client terminal, wherein during the downloading of the remaining part of the second content only the remaining part of an entire part of the second content is downloaded;
reproducing the initial part of the second content during a buffering of the remaining part of the second content in order to reproduce the remaining part of the second content; and
reproducing the remaining part of the second content.

13. A non-transitory computer readable recording medium having recorded thereon a computer program for executing a video on demand (VOD) service method comprising:
uploading a content to a VOD receiver in a download-and-play mode;
receiving feedback information from the VOD receiver during buffering of the content and during the uploading of the content, wherein the buffering of the content is performed in order to reproduce the content;
extracting a second content preferred by a client based on the feedback information; and
uploading an initial part of the second content in a push VOD mode, wherein the initial part of the second content is reproduced during a buffering of a remaining part of the second content in the download-and-play mode, wherein the initial part of the second content and the remaining part of the second content are parts of a same content; and
uploading the remaining part of the second content from the VOD server in the download-and-play mode, wherein during the uploading of the remaining part of the second content only the remaining part of an entire part of the second content is uploaded;
reproducing the initial part of the second content during a buffering of the remaining part of the second content in order to reproduce the remaining part of the second content; and
reproducing the remaining part of the second content.

14. A non-transitory computer readable recording medium having recorded thereon a computer program for executing a video on demand (VOD) service method comprising:
receiving feedback information from a client terminal during a buffering of a first content and during a downloading of the first content;
transmitting the feedback information to a VOD server during the buffering of the first content and during the downloading of the first content;
selecting a second content at the VOD server based on the feedback information;
storing at a VOD receiver an initial part of the second content which is to be reproduced during buffering of a remaining part of the second content in a download-and-play mode, wherein the initial part of the second content and the remaining part of the second content are parts of a same content;
downloading at the VOD receiver the remaining part of the second content from the VOD server in the download-and-play mode such that only the remaining part of an entire part of the second content is downloaded during the downloading of the remaining part of the second content;
reproducing the initial part of the second content during the buffering of the remaining part of the second content in order to reproduce the remaining part of the second content; and
reproducing the remaining part of the second content.

15. The VOD service method of claim 1, wherein the downloading the initial part of the second content comprises automatically pushing the initial part of the second content from the VOD server to the client terminal in response to the VOD server receiving the feedback information from the client terminal.

16. The VOD service method of claim 15, wherein the downloading the initial part of the second content comprises automatically pushing the initial part of the second content from the VOD server to the client terminal after the first content is downloaded.

17. The VOD service method of claim 1, wherein the downloading the initial part of the second content comprises determining a buffering time of the buffering of the second content, determining a data amount which is an amount of data which, while being reproduced, spans the buffering time, and downloading the data amount of the second content as the initial part of the second content.

18. The VOD service method of claim 1, further comprising sequentially reproducing the initial part of the second content and the remaining part of the second content as a single piece of content, wherein the remaining part of the second content is reproduced after the initial part of the second content is completely reproduced.

* * * * *